US007782331B2

(12) United States Patent
Sirois et al.

(10) Patent No.: US 7,782,331 B2
(45) Date of Patent: Aug. 24, 2010

(54) CROSS-PLATFORM RUNTIME CODE GENERATION FOR BIT BLOCK TRANSFER FUNCTIONS

(75) Inventors: Jeffrey R Sirois, Hobart, WA (US); Joshua W Buckman, Redmond, WA (US); Kent D. Lottis, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 344 days.

(21) Appl. No.: 10/877,029

(22) Filed: Jun. 24, 2004

(65) Prior Publication Data

US 2005/0285869 A1   Dec. 29, 2005

(51) Int. Cl.
*G09G 5/37* (2006.01)
*G00G 5/36* (2006.01)
*G06T 1/60* (2006.01)
(52) U.S. Cl. .................. 345/562; 345/557; 345/530
(58) Field of Classification Search .......... 345/562, 345/557, 530; 717/154, 151, 140, 136
See application file for complete search history.

(56) References Cited

U.S. PATENT DOCUMENTS

| 5,357,604 | A | * | 10/1994 | San et al. .............. 463/31 |
| 5,375,198 | A | * | 12/1994 | Guttag et al. ........... 715/806 |
| 5,497,498 | A | * | 3/1996 | Taylor ................. 710/104 |
| 5,604,850 | A |   | 2/1997 | Whitmer |
| 5,748,986 | A | * | 5/1998 | Butterfield et al. ......... 715/209 |
| 6,026,239 | A |   | 2/2000 | Patrick et al. |
| 6,247,174 | B1 | * | 6/2001 | Santhanam et al. ......... 717/154 |
| 6,256,752 | B1 |   | 7/2001 | Blandy et al. |
| 6,279,030 | B1 |   | 8/2001 | Britton et al. |
| 6,305,012 | B1 |   | 10/2001 | Beadle et al. |
| 6,324,688 | B1 |   | 11/2001 | Brown et al. |
| 6,330,711 | B1 |   | 12/2001 | Knutson |

FOREIGN PATENT DOCUMENTS

EP          0578206       1/1994

OTHER PUBLICATIONS

Butterfield, Steve; "Process Images Fast with a Real-Time OS" Electronic Design, Apr. 18, 1994; 7 pages.
Hamilton Jennifer; "Language Integration in the Common Language Runtime" SIGPLAN Notices, vol. 38, Feb. 2003, pp. 19-28.
Masuhara, Hidehiko and Yonezawa, Akinori; "A Portable Approach to Dynamic Optimization in Run-Time Specialization" New Generation Computing, vol. 20, 2002; pp. 101-124.

(Continued)

*Primary Examiner*—Joni Hsu
(74) *Attorney, Agent, or Firm*—Lee & Hayes, PLLC (57) ABSTRACT

An exemplary method for performing a bit block transfer (bitblt) includes receiving one or more graphics parameters specifying the bitblt and generating a specialized bitblt function to perform the bitblt. The specialized bitblt function includes a one or more code blocks selected from a superset of code blocks based on the graphics parameters. A system includes a specialized bit block transfer (bitblt) function generator generating a specialized bitblt function to perform a specified bitblt. The specialized bitblt function includes intermediate language code corresponding to one or more graphics parameters specifying the bitblt. A translator translates the specialized bitblt function into machine-specific language code.

11 Claims, 3 Drawing Sheets

OTHER PUBLICATIONS

Masuhara, Hidehiko and Yonezawa, Akinori; "Run-Time Bytecode Specialization: A Portable Approach to Generating Optimized Specialized Code" Lecture Notes in Computer Science, vol. 2053, 2001; pp. 138-154.

Auslander el al.; "Fast, Effective Dynamic Compilation"; Department of Computer Science and Engineering University of Washington; 11 pages.

Iterators and Allocators; Chapter 19 section 19.4.5 Dynamic Memory; 3 pages.

Malqvist et al.; "Runtime Code Generation"; May 6, 1996; 16 pages.

Noel et al. "Automatic, Template-Based Run-Time Specialization: Implementation and Experimental Study"; 11 pages.

Rasterop (a.k.a. Bitblt); web/20040103131439/http://www.leptonica.com/rasterops.html; Aug. 9, 2005; 6 pages.

* cited by examiner

CROSS-PLATFORM RUNTIME CODE GENERATION FOR BIT BLOCK TRANSFER FUNCTIONS

TECHNICAL FIELD

The described subject matter relates to data transfer in a computer, and more particularly to cross-platform run-time code generation for bit block transfer functions.

BACKGROUND

In some fields of computing, it is often necessary to transfer a rectangular block of bits from one memory location to another. For example, in video gaming, a block of bits representing an image or surface may be transferred from system memory into video memory for display to a user. Such a data transfer is commonly referred to as a bit block transfer (bitblt). In video gaming, a bitblt should be very fast so that graphics presentation is smooth and devoid of noticeable delays to the user. In a computer that lacks sophisticated graphics hardware, such as an accelerated graphics card, bit-blts are often performed by software, such as emulation software, which emulates graphics hardware.

Bitblt functions often involve not only a data block transfer, but also an operation performed on the data. For example, while the data block is being transferred from one memory location to another, a transparency operation may be applied to the data block. Other operations, such as raster operations (ROPs), stretching, shrinking, alpha-blend, and color-conversion may be performed as well, depending on the situation. Any combination of operations may be required during a bitblt.

A bitblt software developer typically develops code to handle all the bitblt operations that may be required. Unfortunately, traditional approaches to developing bitblt software functions are fraught with difficult trade-offs between code size and code performance. Two general approaches include: (1) writing many (e.g., hundreds) functions, one for each bitblt operation, to achieve optimal performance of software bitblts in all situations, or (2) writing a single (or a small number of) bitblt function(s) that can perform any bitblt by branching to the correct bitblt operations within the function. The first approach results in fast bitblt performance, but extremely large code size. The second approach results in a reasonable code size, but much slower bitblt performance because of overhead involved with branching to the correct bitblt operations.

In addition, a traditional bitblt function does not allow for runtime optimization. The traditional bitblt function is typically coded and compiled into machine code for a particular target platform (e.g., microprocessor) prior to deployment in a system. While the traditional bitblt function, as a whole, may be optimized for speed (or size) for the target platform at compile time, once compiled, particular operations (e.g., ROPs, transparency, etc.) within the traditional bitblt function cannot be further optimized for speed after deployment. When a single bitblt function is used, and branches are made to a specific bitblt operation, the branching can result in sub-optimal performance for the specific operation.

SUMMARY

Implementations are described and claimed herein for generating a specialized bit block transfer (bitblt) function at runtime. The specialized bitblt function performs one or more bitblt operations and is generated from a superset of bitblt operations. The specialized bitblt function is composed of intermediate language code that is translated into platform-specific machine language code at runtime. The specialized bitblt function can be incrementally optimized for speed during runtime.

DETAILED DESCRIPTION

Exemplary Bit Block Transfer System

Figure 1:
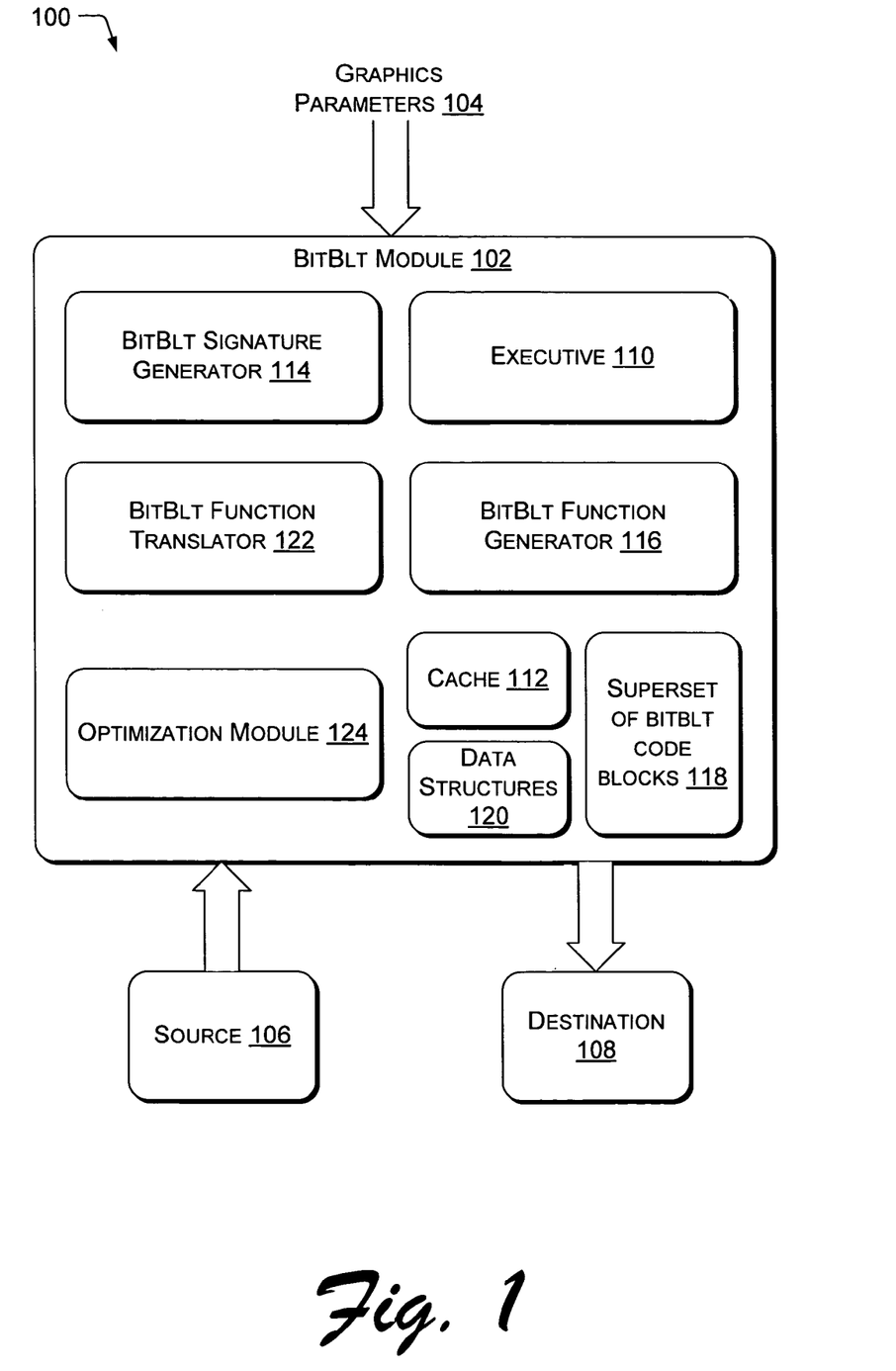
FIG. 1 illustrates an exemplary bit block transfer (bitblt) system for runtime code generation of a bit block transfer function for transferring a block of data from one location to another location while performing one or-more graphics operations on the block of data.

FIG. 1 illustrates an exemplary bit block transfer (bitblt) system 100 for transferring a block of data from one location to another location while performing one or more graphics operations on the block of data. The bitblt system 100 can be implemented in a general purpose computer, such as the general purpose computer shown in FIG. 3, or a specialized computer, such as a gaming system.

The bitblt system 100 includes a bitblt module 102 that performs a specified bitblt operation. The bitblt module 102 will typically be implemented as a software module, although it might also be implemented in hardware, firmware, or a combination of these technologies.

Generally, the bitblt module 102 receives graphics parameters 104 specifying a particular bitblt operation and transfers a data block from a source 106 to a destination 108. The graphics parameters 104 are typically provided in a function call to the bitblt module 102. Included in the graphics parameters 104 is information specifying any operations to be performed on the data block that is to be transferred in the bitblt operation. Also included in the graphics parameters 104 are an identifier for the source 106 and the destination 108.

The source 106 is a memory location from which the data block is to be transferred, and the destination 108 is the memory location to which the data block is to be transferred. The source 106 and the destination 108 can be any type of memory including, but not limited to, system memory or video memory. The source 106 and the destination 108 may be specified in the graphics parameters 104 with pointers. The graphics parameters 104 may also specify other memory locations used during the bitblt operation, such as a pattern memory (not shown) and a mask memory (not shown).

Initially, an executive 110 receives the graphics parameters 104. The executive 110 is a logical component within the bitblt module 102 that uses the graphics parameters 104 to determine how the specified bitblt operation is to be executed. The executive 110 can cause a specialized bitblt function to be generated that is then executed to perform the specified bitbit operation. The executive 110 also stores the generated bitblt function in a cache 112, and labels the specialized generated bitblt function with a unique bitblt signature that identifies the specialized generated bitblt function. When the specialized bitblt function is needed in the future, it is retrieved from the cache rather than generated anew.

Figure 2:
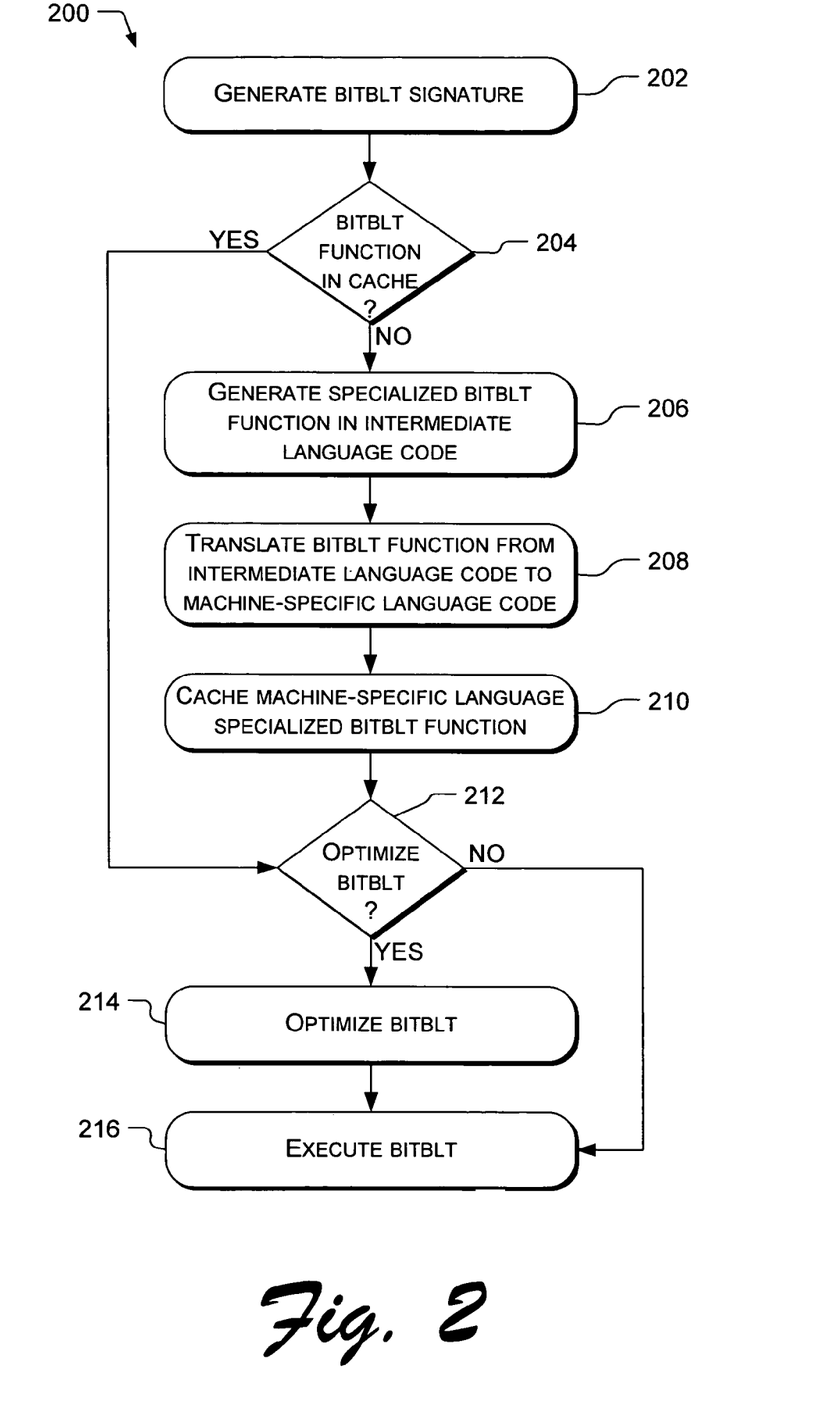
FIG. 2 illustrates an algorithm for generating a specialized bitblt function for performing a specified bitblt operation.

Accordingly, when the executive 110 receives the graphics parameters, the executive 110 calls a bitblt signature generator 114. The call to the bitblt signature generator 114 includes the graphics parameters 104. Based on the graphics parameters 104, the bitblt signature generator 114 creates a bitblt signature uniquely identifying the requested bitblt operation. Exemplary implementations of operations performed by the bitblt signature generator 114 are shown in FIG. 2 and discussed further below.

The executive 110 uses the generated bitblt signature from the bitblt signature generator 114 to determine whether a specialized bitblt function already exists in the cache 112 or whether a specialized bitblt function needs to be generated. The executive 110 searches the cache 112 for a specialized bitblt function that has a bitblt signature equal to the bitblt signature generated by the bitblt signature generator 114. If a specialized bitblt function is found in the cache 112 that has the bitblt signature of the specified bitbit operation, the executive executes that specialized bitblt function.

If a bitblt function having the generated bitblt signature is not found in the cache 112, the executive 110 calls a bitblt function generator 116 to generate a specialized bitblt function to perform the specified bitblt operation. The bitblt function generator 116 generates the specialized bitblt function by selecting one or more code blocks from a superset of bitblt code blocks 118. Each of the code blocks in the superset of code blocks 118, when executed, performs a bitblt operation or a part of a bitblt operation. The bitblt function generator 116 selects the code block or code blocks from the superset of code blocks 118 and copies the selected code block or code blocks into a specialized bitblt function.

The bitblt function generator 116 uses one or more data structures 120 to select the code blocks from the superset of bitblt code blocks 118. The data structures 120 provide information about the superset of bitblt code blocks 118, such as offsets, code block sizes, and condition information specifying whether or not to copy a code block from the superset of bitblt code blocks 118 into a specialized bitblt function. Exemplary data structures 120 for use in selecting code blocks for the specialized bitblt function are shown and described further below.

In one implementation of the superset of bitblt code blocks 118, the code blocks are represented in intermediate language (IL) code. The term IL refers to a target language into which all or part of a single statement or a source program, in a source language, is translated before it is further translated or interpreted. IL code is generally platform, or microprocessor-independent. Therefore, IL code can be ported to any platform that has a translator (or interpreter) for translating (or interpreting) the IL code into machine-specific code executable on the particular platform. In this implementation, the bitblt function generator 116 creates a specialized bitblt function in IL code based on the IL code blocks in the superset of bitblt code blocks 118.

A bitblt function translator 122 translates the IL code of the specialized bitblt function into machine-specific (or platform-specific) code. A particular implementation of the bitblt function translator includes a virtual machine, such as the NET platform from MICROSOFT CORPORATION.

After the specialized bitblt function is translated into machine-specific code, the machine-specific specialized bitblt function is stored in the cache 112. In one implementation of the cache 112, the generated bitblts use a fixed size function cache to minimize total bitblt code size.

The specialized bitblt function is stored in, and retrieved from, the cache 112 using the specialized bitblt function's bitblt signature. From the cache 112, the specialized bitblt function can be executed again in the future, if the corresponding bitblt operation is requested.

In addition, after the specialized bitblt function is translated into machine-specific language code, an optimization module 124 can optimize the specialized bitblt function. Optimization may occur for all specialized bitblt functions, or for only those specialized bitblt functions that are accessed more than a specified number of times. Optimization can include removing unnecessary lines of code, rearranging lines of code, or otherwise, to improve the performance of the specialized bitblt function.

In one implementation of the superset of bitblt code blocks 118 the bitblt code blocks are contained in a generalized bitblt function. Below is shown a small portion of an exemplary generalized bitblt function represented in intermediate language code. For ease of explanation, only 14 lines of intermediate language code are shown. An actual implementation of a generalized bitblt function typically contains many more lines of IL code (e.g., thousands).

| | |
|---|---|
| gb_1_0 | ; Offset = 0 |
| if b0 | ; Offset = 1 |
|    mov r0, 0 | ; Offset = 3 |
| endif | ; Offset = 6 |
| if b1 | ; Offset = 7 |
|    mov r0, 2 | ; Offset = 9 |
|    if b2 | ; Offset = 12 |
|       mov r0, 3 | ; Offset = 14 |
|    endif | ; Offset = 17 |
| else | ; Offset = 18 |
|    mov r0, 4 | ; Offset = 19 |
|    mov r0, 5 | ; Offset = 22 |
| endif | ; Offset = 25 |
| eof | ; Offset = 26 |

The offset of each line of code in the generalized bitblt function provides the address offset (in bytes) into the generalized bitblt function, of the corresponding line of code.

The generalized bitblt function can be designed to perform any bitblt operation, including, but not limited to, stretching, shrinking, transparency, alpha blending, color conversion, any of the 256 ternary raster operations (ROP3), use of a mask to select two different ROP3's, or combinations of these operations. For a particular bitblt operation, some of these operations will not be performed (e.g., stretching and shrinking are mutually exclusive, color conversion is only between two different formats, not all different formats, etc). A specialized bitblt function is generated that includes only code necessary to perform a particular bitblt operation.

In a particular implementation, the specialized bitblt function generator 116 initially loads a set of IL registers based on the bitblt signature. In this implementation, the b-registers (b0-b31) in the IL register data structure are loaded with data from the bitblt signature. One example of how the b-registers may be loaded is shown below:

```
b0: Blt Signature SolidFill
b1: Blt Signature ScanXPositive
b2: Blt Signature ScanYPositive
b3: Blt Signature StretchX
b4: Blt Signature StretchY
b5: Blt Signature ShrinkX
b6: Blt Signature ShrinkY
b7: Blt Signature SourceConstantAlpha
b8: Blt Signature PerPixelAlpha
b9: Blt Signature SrcColorKey
```

-continued

```
b10: Blt Signature DstColorKey
b11: True if the destination is in video memory
b12: True if the source is in video memory
b13: True if the pattern is in video memory
b14: True if the mask is in video memory
b15: Blt Signature MirrorX
b16: Blt Signature MirrorY
b17: Blt Signature Lookup
b18: Blt Signature Convert
b19: True if any of b3, b4, b5, or b6 is true
b20: True if the destination is used as part of the ROP3
b21: True if the source is used as part of the ROP3
b22: True if the pattern is used as part of the ROP3
b23: True if the mask is used as part of the bitblt
b24: True if the ROP3 is used as part of the bitblt
b25: True if the source is 24 bits per pixel
b26: True if the destination is 8 bits per pixel
b27: True if the destination is 16 bits per pixel
b28: True if the destination is 24 bits per pixel
b29: True if the destination is 32 bits per pixel
```

Exemplary bitblt signature data is discussed in further detail below.

After the b-registers are loaded with bitblt signature data, the specialized bitblt function generator 116 steps through code blocks in the generalized bitblt function and determines which code blocks should be copied into the specialized bitblt function based on values in the b-registers and values in the data structures 120. The code for unnecessary operations need not be copied from the generalized bitblt function into a specialized bitblt function.

One implementation of the data structures 120 includes three tables, which the specialized bitblt function generator 116 uses to determine whether a code block will be copied to the specialized bitblt function: an invariant table, a Rop3 table, and a convert table. The invariant table is the primary table used, and describes what instructions of the specialized bitblt function are required to perform a particular bitblt operation. The Rop3 table indicates what instructions are required for each of the 256 ROP3 operations. The convert table indicates which instructions are required to convert between any two color formats. Exemplary definitions of the invariant table, the ROP3 table and the convert table are shown and described below in terms of structures in the C language:

InvariantTable

```
struct
{
short Offset;
short Condition;
short Size;
short Skip;
} InvariantTable[256];
```

Referring to the exemplary invariant table above, the Offset field represents the number of DWORDs from the beginning of the generalized bitblt function to the beginning of the current code block. A code block is the consecutive intermediate language instructions to which an entry in the Invariant-Table refers.

The Condition field can take on three different meanings. If Condition is 0, this code block is not a conditional block, and should be copied to the specialized bitblt function. If Condition is greater than zero, then if the register b[Condition −1] is true, the block is to be copied, but if the register b[Condition −1] is false, the block is to be skipped. If Condition is less than zero, then if the register b[Condition −1] is true, the code block is to be skipped, but if the register b[Condition −1] is false, the block is to be copied to the specialized bitblt function.

The Size field of the InvariantTable represents the size (in DWORDs) of the code block to copy to the specialized bitblt function. The Skip field represents the number of DWORDs to skip to get to the next code block.

Rop3Table:

```
struct
{
    short Offset;
    BYTE Size;
    BYTE Rop3;
} Rop3Table[256];
```

The Offset field represents the number of DWORDs from the beginning of the generalized bitblt function to the beginning of the code block which handles a particular ROP3 code. The Size field represents the size (in DWORDs) of the code block to copy to the specialized bitblt function. The Rop3 field is the ROP3 code associated with the code block referenced by this entry of the table references.

ConvertTable:

```
struct
{
    short Offset;
    BYTE Size;
    BYTE Convert;
} ConvertTable[256];
```

The Offset field represents the number of DWORDs from the beginning of the generalized bitblt function to the beginning of the block which handles a particular color conversion process. The Size field represents the size (in DWORDs) of the code block to copy to the specialized bitblt function. The Convert field is the color conversion code associated with the code block referenced by this entry of the table.

The manner of using the three tables is now described. As discussed above, the b-registers (b0-b31) are initialized based on the bitblt signature corresponding to a specific bitblt operation. The state of the b-registers is then used to construct the specialized bitblt function from the generalized bitblt function and the three tables.

The following rules are used with respect to the tables to generate a specialized bitblt function:

1. If the Condition field is zero, Size DWORDs are copied to the specialized bitblt function, and Skip DWORDs are skipped in the generalized bitblt function.
2. If the Condition variable is positive and the associated b-register is true, the "if" instruction is skipped. If the b-register is false, Skip DWORDs are skipped in the generalized bitblt function.
3. If the Condition variable is negative and the associated b-register is true, Skip DWORDs are skipped in the generalized bitblt function. If the b-register is false, the "else" instruction is skipped.

To illustrate how the tables may be used, an exemplary invariant table is shown below and an exemplary scenario is given. The following examples are based on the exemplary portion of the generalized bitblt function shown above. For ease of illustration, the exemplary IL code is presented below:

```
gb_1_0              ; Offset = 0
if b0               ; Offset = 1
    mov r0, 0       ; Offset = 3
endif               ; Offset = 6
if b1               ; Offset = 7
    mov r0, 2       ; Offset = 9
    if b2           ; Offset = 12
        mov r0, 3   ; Offset = 14
    endif           ; Offset = 17
else                ; Offset = 18
    mov r0, 4       ; Offset = 19
    mov r0, 5       ; Offset = 22
endif               ; Offset = 25
eof                 ; Offset = 26
```

TABLE 1

Exemplary InvariantTable

| Offset | Condition | Size | Skip |
|---|---|---|---|
| 0 | 0 | 1 | 1 |
| 1 | 1 | | 3 |
| 3 | 0 | 3 | 3 |
| 6 | 0 | 0 | 1 |
| 7 | 2 | | 9 |
| 9 | 0 | 3 | 3 |
| 12 | 3 | | 4 |
| 14 | 0 | 3 | 3 |
| 17 | 0 | 0 | 1 |
| 18 | −2 | | 6 |
| 19 | 0 | 6 | 6 |
| 25 | 0 | 0 | 1 |
| 26 | 0 | 1 | 1 |

In the above variant table, the offset column contains offsets into the generalized bitblt function. When the condition field is zero, an amount of code indicate in the size field is copied to the specialized bitblt function, starting from the offset shown in the offset field. Given the above exemplary InvariantTable and the above exemplary generalized bitblt function, and assuming b0 is true, b1 is false, and b2 is true, the resulting specialized bitblt function is:

gb_1_0 mov r0, 0 mov r0, 4 mov r0, 5 eof

As another example, if b0 is false, b1 is true, and b2 is true, and using the above InvariantTable and generalized bitblt function, the resulting specialized bitblt function is:

gb_1_0 mov r0, 2 mov r0, 3 eof

The tables are generated at runtime by parsing the generalized bitblt function searching for the instruction "if <b-register>" followed by an optional "else" instruction, followed by a required "endif" instruction. The instruction "if b18" indicates that the ConvertTable should be used and the instruction "if b24" indicates that the Rop3Table should be used.

In a particular implementation, the following rules are followed for constructing the tables:

1. An "if b<N>" instruction results in an entry which has a positive Condition value (<N>+1), the Size is ignored, and the Skip is set to the number of DWORDs until the "else" or "endif" instruction corresponding to the "if" instruction.
2. An "else" instruction results in an entry which has a negative Condition value −(<N>+1), the Size is ignored, and the Skip is set to the number of DWORDs until the matching "endif" instruction.
3. An "endif" instruction results in an entry which has a zero for the Condition number, a zero for the Size, and a one for the Skip.
4. A block of instructions that do not include "if", "else", or "endif" are grouped together in one entry in the table with a Condition value of zero, and the Size and Skip variables are the number of DWORDs in the current block of instructions.

Exemplary Bitblt Signature and Bitblt Generation Process

In a particular implementation of a bitblt signature generator, a C structure (called BltSignature) is organized in three main pieces: a 32 bit value that is used as a bitfield containing information about a specified bitblt operation, a 16 bit value that provides additional information about the format of the bit block or blocks to be operated on by the bitblt, and another 16 bit value which includes one or more ROP codes used for the specified bitblt operation. In this exemplary implementation, a bit block is referred to as a surface, which refers to a block of pixel data. The following diagram shows the layout of the BltSignature structure, and the meaning of each bit.

BltSignature Structure:

| Field Name | Number of Bits |
|---|---|
| DstFormat | 4 |
| SrcFormat | 4 |
| BltMode | 5 |
| PatternType | 1 |
| ScanXPositive | 1 |
| ScanYPositive | 1 |
| UseStretch | 4 |
| UseAlpha | 2 |
| ColorKeyType | 2 |
| DstMemory | 1 |
| SrcMemory | 1 |
| PatMemory | 1 |
| MaskMemory | 1 |
| MirrorX | 1 |
| MirrorY | 1 |
| Lookup | 1 |
| Convert | 1 |
| Dst8Bpp | 1 |
| Dst16Bpp | 1 |
| Dst24Bpp | 1 |
| Dst32Bpp | 1 |
| Src24Bpp | 1 |
| Unused | 11 |
| ForegroundRop | 8 |
| BackgroundRop | 8 |

The foregoing BltSignature structure can be implemented in C programming language or any other suitable language. Each of the fields in the BltSignature are described below:

DstFormat and SrcFormat:
0 This is an invalid format number
1 The pixel format is ARGB8888
2 The pixel format is ABGR8888
3 The pixel format is RGB888
4 The pixel format is BGR888
5 The pixel format is RGB565
6 The pixel format is RGB555
7 A surface with a color palette
8 A 1 bit per pixel surface.
Some unknown format type that uses bit
9 masks.
BltMode and Unused fields may be ignored.
Pattern Type:
0 A solid color
1 A bitmap pattern
ScanXPositive:
0 Process pixels in the −X direction.
1 Process pixels in the X direction
ScanYPositive:
0 Process pixels in the −Y direction
1 Process pixels in the Y direction
UseStretch:
0 No stretching or shrinking
1 Stretching in the X direction
2 Stretching in the Y direction
4 Shrinking in the X direction
8 Shrinking in the Y direction
UseAlpha:
0 No AlphaBlending
1 Use source constant alpha
2 Use per-pixel source alpha
ColorKeyType:
0 No color key
1 The source has a color key
2 The destination has a color key
DstMemory, SrcMemory PatMemory, MaskMemory:
0 Video Memory
1 System Memory
MirrorX:
0 Don't flip the source surface about the X axis
1 Flip the source surface about the X axis
MirrorY:
0 Don't flip the source surface about the Y axis
1 Flip the source surface about the Y axis
Lookup:
0 Don't use a color lookup table
1 Use a color lookup table
Convert:
0 Don't use color conversion
1 Use color conversion
Dst8Bpp:
0 The destination is not 8 bits per pixel
1 The destination is 8 bits per pixel
Dst16Bpp:
0 The destination is not 16-bits per pixel
1 The destination is 16 bits per pixel
Dst24Bpp:
The destination is not 24 bits per
0 pixel
1 The destination is 24 bits per pixel
Dst32Bpp:
0 The destination is not 32 bits per pixel
1 The destination is 32 bits per pixel
Src24Bpp:
0 The source is not 24 bits per pixel
1 The source is 24 bits per pixel In this particular implementation, ForegroundRop and BackgroundRop are both ROP3 codes that specify a raster operation associated with the specified bitblt operation.

An exemplary scenario is now described to illustrate how to generate a bitblt signature based on graphics parameters received in a bitblt function call.

Assume that an application calls bitblt function BitBlt( ) with the following call: BitBlt(hdc, 0, 0, 100, 100, hdcSrc, 0, 0, SRCCOPY), where hdc represents a RGB565 surface in video memory and hdcSrc represents an 8 bits-per-pixel (bpp) palletized surface in system memory. The graphics parameters of the foregoing exemplary function call correspond to the following bitblt signature represented by a BltSignature structure:

| Field Name | Value (in hex) |
| --- | --- |
| DstFormat | 5 |
| SrcFormat | 7 |
| BltMode | 0 |
| PatternType | 0 |
| ScanXPositive | 1 |
| ScanYPositive | 1 |
| UseStretch | 0 |
| UseAlpha | 0 |
| ColorKeyType | 0 |
| DstMemory | 0 |
| SrcMemory | 1 |
| PatMemory | 0 |
| MaskMemory | 0 |
| MirrorX | 0 |
| MirrorY | 0 |
| Lookup | 1 |
| Convert | 1 |
| Dst8Bpp | 0 |
| Dst16Bpp | 1 |
| Dst24Bpp | 0 |
| Dst32Bpp | 0 |
| Src24Bpp | 0 |
| Unused | 0 |
| ForegroundRop | 0xCC |
| BackgroundRop | 0xCC |

For the SRCCOPY ROP3, a pattern and mask are not required, so values PatternType and MaskMemory are all zero. The exemplary call to BitBlt( ) does not involve an alpha blend, so UseAlpha is set to zero. The exemplary call to BitBlt( ) does not involve a transparent image, so ColorKeyType is set to zero. The exemplary function BitBlt( ) does not allow for stretching, so UseStretch is zero as well. MirrorX and MirrorY can only be non-zero if StretchBlt, AlphaBlend, or TransparentImage are called with a negative width or height, so in this case, they are zero. Finally, BltMode is zero because BltMode only applies to StretchBlt.

Because the destination, hdc, is an RGB565 surface in video memory implies that DstFormat is 5, Dst8Bpp is zero, Dst16Bpp is one (since RGB565 is 16 bits per pixel by definition), Dst24Bpp is zero, Dst32Bpp is zero, and DstMemory is zero. Because the source, hdcSrc, is an 8 bit per pixel palletized surface in system memory implies that SrcFormat is 7, Src24Bpp is zero, and SrcMemory is one. Since the source and destination are different pixel formats, Convert is set to a value of one. The source is a palletized surface, so Lookup is also set to one to allow the specialized function to look up the palletized color value.

The ForegroundRop and BackgroundRop entries are the same because the exemplary call to BitBlt does not involve a mask operation. As shown, ForegroundRop and BackgroundRop are 0xCC because 0xCC is the numerical value for SRCCOPY.

Exemplary Operations

Described herein are exemplary methods for cross-platform runtime code generation of bit block transfer (bitblt) functions. The methods described herein may be embodied as logic instructions on one or more computer-readable medium. When executed on a processor, the logic instructions cause a general purpose computing device to be programmed as a special-purpose machine that implements the described methods. In the following exemplary operations, the components and connections depicted in the figures may be used to implement cross-platform runtime code generation of bitblt functions.

FIG. 2 illustrates an exemplary bitblt algorithm 200 that uses a specialized bitblt function to perform a specified bitblt operation. Generally, if the specialized bitblt function is found in cache memory, the cached specialized bitblt function is executed. If the specialized bitblt function is not found in cache memory, the specialized bitblt function is generated during runtime and executed. It is assumed that, upon entry into the bitblt algorithm 200, a bitblt function call has been to request a bitblt operation. The function call includes one or more graphics parameters specifying the bitblt operation to be performed.

A generating operation 202 generates a bitblt signature based on the graphics parameters. One implementation of the generating operation creates a BltSignature (described above) using the graphics parameters. The bitblt signature uniquely identifies the bitblt operation specified in the bitblt function call.

A determining operation 204 determines whether a machine-specific language specialized bitblt function exists in cache that corresponds to the requested bitblt operation. The determining operation 204 searches for a function in the cache that has the same bitblt signature as the bitblt signature generated by the generating operation 202. If a specialized bitblt function is found in the cache, the bitblt algorithm branches "YES" to a determining operation 212, discussed below. If a specialized bitblt function is not found in the cache, the bitblt algorithm branches "NO" to generating operation 206.

The generating operation 206 generates the specialized bitblt operation corresponding to the requested bitblt operation. In one implementation of the generating operation 206, the generating operation 206 steps through a generalized bitblt function, determining whether code blocks in the generalized bitblt function should be used to perform the requested bitblt operation. At each code block in the generalized bitblt function, the generating operation 206 uses the bitblt signature to determine whether the given code block is necessary.

The generating operation 206 also accesses data structures such as the InvariantTable, ConvertTable, and ROP3Table, described above, to determine whether the code block is necessary and, if so, how much data to copy from the generalized bitblt function into the specialized bitblt function. The generating operation 206 also uses the tables to determine how much data to skip in the generalized bitblt function to step to the next code block. The output of the generating operation 206 is a specialized bitblt operation in intermediate language code.

A translating operation 208 translates the specialized bitblt function from intermediate language code to machine-specific language code. The translating operation 208 is performed by a translator that can read the intermediate language code and generate code that is specific to the machine on which the bitblt algorithm is running. The translating operation 208 can be performed by a virtual machine.

A caching operation 210 caches the machine-specific language code representing the specialized bitblt function. The caching operation 210 labels the machine-specific language specialized bitblt function with the bitblt signature (generated in the generating operation 202) and saves the machine-specific language specialized bitblt function in cache memory. In one implementation of the caching operation 210, a fixed size function cache is used to minimize the total bitblt code size.

The determining operation 212 determines whether to optimize the machine-specific language specialized bitblt function. In one implementation of the determining operation 212, it is determined whether the machine-specific language specialized bitblt function is executed frequently. In this implementation, the determining operation 212 determines whether the machine-specific language specialized bitblt function has been executed a specified number of times. If the determining operation 212 determines that the machine-specific language specialized bitblt function should be optimized, the bitblt algorithm 200 branches "YES" to an optimizing operation 214.

The optimizing operation 214 optimizes the machine-specific language specialized bitblt function at runtime. The optimizing operation 214 makes changes to the machine-specific language specialized bitblt function in order to make the function faster, more efficient, or otherwise improve performance. One implementation of the optimizing operation 214 optimizes the machine-specific language specialized bitblt function incrementally.

After the optimizing operation 214, and if the determining operation 212 determines that the machine-specific language specialized bitblt function should not be optimized, an executing operation 216 executes the machine-specific language specialized bitblt function.

Exemplary Computing Device

Figure 3:
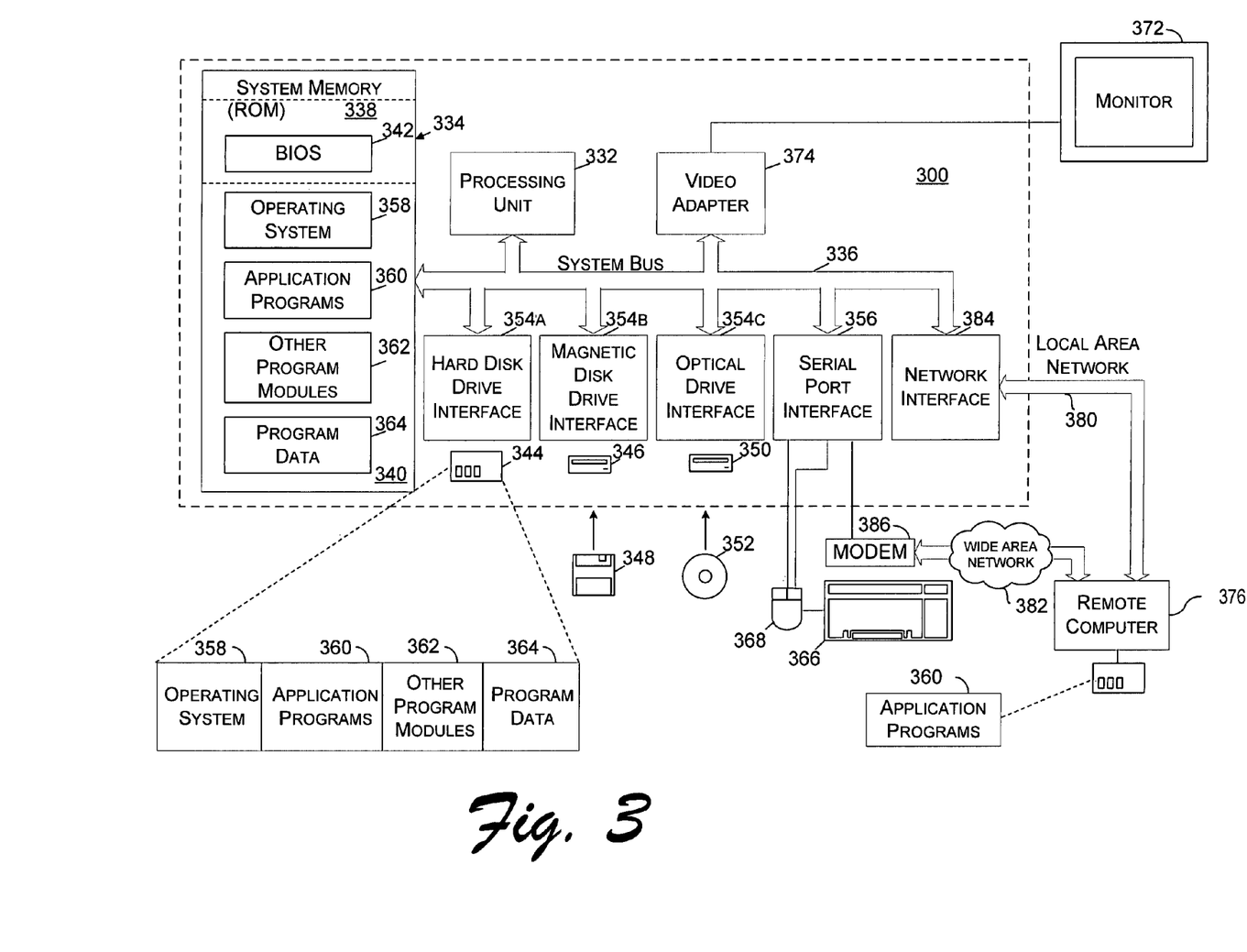
FIG. 3 illustrates a general purpose computer that can be used to implement cross-platform runtime code generation for bitblt functions.

FIG. 3 is a schematic illustration of an exemplary computing device 300 that can be used to implement cross-platform runtime code generation of bit block transfer (bitblt) functions. Computing device 300 includes one or more processors or processing units 332, a system memory 334, and a bus 336 that couples various system components including the system memory 334 to processors 332. The bus 336 represents one or more of any of several types of bus structures, including a memory bus or memory controller, a peripheral bus, an accelerated graphics port, and a processor or local bus using any of a variety of bus architectures. The system memory 334 includes read only memory (ROM) 338 and random access memory (RAM) 340. A basic input/output system (BIOS) 342, containing the basic routines that help to transfer information between elements within computing device 300, such as during start-up, is stored in ROM 338.

Computing device 300 further includes a hard disk drive 344 for reading from and writing to a hard disk (not shown), and may include a magnetic disk drive 346 for reading from and writing to a removable magnetic disk 348, and an optical disk drive 350 for reading from or writing to a removable optical disk 352 such as a CD ROM or other optical media. The hard disk drive 344, magnetic disk drive 346, and optical disk drive 350 are connected to the bus 336 by appropriate interfaces 354a, 354b, and 354c.

The drives and their associated computer-readable media provide nonvolatile storage of computer-readable instructions, data structures, program modules and other data for computing device 300. Although the exemplary environment described herein employs a hard disk, a removable magnetic disk 348 and a removable optical disk 352, other types of computer-readable media such as magnetic cassettes, flash memory cards, digital video disks, random access memories (RAMs), read only memories (ROMs), and the like, may also be used in the exemplary operating environment.

A number of program modules may be stored on the hard disk 344, magnetic disk 348, optical disk 352, ROM 338, or RAM 340, including an operating system 358, one or more application programs 360, other program modules 362, and program data 364. A user may enter commands and information into computing device 300 through input devices such as a keyboard 366 and a pointing device 368. Other input devices (not shown) may include a microphone, joystick, game pad, satellite dish, scanner, or the like. These and other input devices are connected to the processing unit 332 through an interface 356 that is coupled to the bus 336. A monitor 372 or other type of display device is also connected to the bus 336 via an interface, such as a video adapter 374.

Generally, the data processors of computing device 300 are programmed by means of instructions stored at different times in the various computer-readable storage media of the computer. Programs and operating systems may be distributed, for example, on floppy disks, CD-ROMs, or electronically, and are installed or loaded into the secondary memory of the computing device 300. At execution, the programs are loaded at least partially into the computing device's 300 primary electronic memory.

Computing device 300 may operate in a networked environment using logical connections to one or more remote computers, such as a remote computer 376. The remote computer 376 may be a personal computer, a server, a router, a network PC, a peer device or other common network node, and typically includes many or all of the elements described above relative to computing device 300. The logical connections depicted in FIG. 3 include a LAN 380 and a WAN 382. The logical connections may be wired, wireless, or any combination thereof.

The WAN 382 can include a number of networks and subnetworks through which data can be routed from the computing device 300 and the remote computer 376, and vice versa. The WAN 382 can include any number of nodes (e.g., DNS servers, routers, etc.) by which messages are directed to the proper destination node.

When used in a LAN networking environment, computing device 300 is connected to the local network 380 through a network interface or adapter 384. When used in a WAN networking environment, computing device 300 typically includes a modem 386 or other means for establishing communications over the wide area network 382, such as the Internet. The modem 386, which may be internal or external, is connected to the bus 336 via a serial port interface 356.

In a networked environment, program modules depicted relative to the computing device 300, or portions thereof, may be stored in the remote memory storage device. It will be appreciated that the network connections shown are exemplary and other means of establishing a communications link between the computers may be used.

The computing device 300 may be implemented as a server computer that is dedicated to server applications or that also runs other applications. Alternatively, the computing device 300 may be embodied in, by way of illustration, a stand-alone personal desktop or laptop computer (PCs), workstation, personal digital assistant (PDA), or electronic appliance, to name only a few.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer-readable media. Computer-readable media can be any available media that can be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer-readable instructions, data structures or program modules. Communication media also includes any information delivery media. By way of example, and not limitation, communication media includes wired media such as a wired network or direct-wired connection, and wireless media such as acoustic, RF, infrared, and other wireless media. Combinations of any of the above are also included within the scope of computer-readable media.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

What is claimed is:

1. A computer-implemented method that causes at least one computing device to perform a bit block transfer (bitblt), the method comprising:

generating a bitblt signature, based on one or more received graphics parameters specifying a bitblt, wherein the bitblt signature uniquely identifies a bitblt operation to perform;

determining if a machine-specific language specialized bitblt function exists in cache that corresponds to a desired bitblt function by searching the cache for the bitblt signature;

generating, if no machine-specific language specialized bitblt function exists, a specialized bitblt function based on the received one or more graphics parameters to perform the bitblt, the specialized bitblt function comprising intermediate language code comprising a set of one or more code blocks from a superset of code blocks corresponding to multiple bitblt operations;

translating the intermediate language code into machine-specific language code, wherein the intermediate code includes registers, and wherein the registers are loaded with data from the bitblt signature;

caching the machine-specific language code;

determining if the machine-specific language code should be optimized, wherein the determining is based on whether the specialized bitblt function has been executed a specified number of times; and executing the cached machine-specific language code.

2. The computer-implemented method as recited in claim 1, further comprising:
   determining whether the specialized bitblt function is cached in a memory; and
   executing the specialized bitblt function from the memory.

3. The computer-implemented method as recited in claim 1, wherein the optimizing comprises incrementally optimizing the machine-specific language code.

4. The computer-implemented method as recited in claim 1, wherein the optimizing comprises optimizing the machine-specific language code during runtime.

5. A computer storage memory device, comprising computer program instructions executable by a processor, the computer program instructions, when executed, performing operations comprising:
   receiving one or more graphics parameters specifying a bit block transfer (bitblt);
   generating a bitblt signature, based on one or more received graphics parameters specifying a bitblt, wherein the bitblt signature uniquely identifies an operation to perform the bitblt;
   determining if a machine-specific language specialized bitblt function exists in cache that corresponds to a desired bitblt function by searching the cache for the bitblt signature;
   dynamically generating, if no machine-specific language specialized bitblt function exists, a specialized bitblt function to perform the bitblt, the specialized bitblt function comprising intermediate language code, the intermediate language code comprising a set of one or more code blocks from a superset of code blocks corresponding to multiple bitblt operations;
   translating the intermediate language code into machine-specific language code, wherein the intermediate code includes registers, and wherein the registers are loaded with data from the bitblt signature;
   caching the machine-specific language code;
   determining if the machine-specific language code should be optimized, wherein the determining is based on whether the specialized bitblt function has been executed a specified number of times, and if so, optimizing the machine-specific language code at runtime, wherein the optimizing changes improve performance of the machine-specific language code; and
   executing the cached machine-specific language code.

6. The computer storage memory device as recited in claim 5, wherein the optimizing comprises incrementally optimizing the machine-specific language code.

7. A system, comprising:
   a specialized bit block transfer (bitblt) function generator generating a specialized bitblt function to perform a specified bitblt, the specialized bitblt function comprising intermediate language code corresponding to one or more graphics parameters specifying the bitblt;
   a translator translating the specialized bitblt function into machine-specific language code;
   a bitblt signature generator generating a bitblt signature based on one or more graphics parameters, the bitblt signature uniquely identifying the specified bitblt function, wherein the bitblt signature is configured to contain sufficient data to load registers within the intermediate language code with data; and
   an optimization model optimizing the machine-specific language code during runtime, wherein the optimizing module determines if an optimization should be performed on whether the specialized bitblt function has been executed a specified number of times.

8. A system as recited in claim 7 further comprising a cache containing one or more specialized bitblt functions in machine-specific language code.

9. A system as recited in claim 7 further comprising a data structure for identifying a code block in the generalized bitblt that corresponds to the specified bitblt.

10. A system, comprising:
    a source memory and a destination memory;
    bitblt module dynamically creating a specialized bit block transfer (bitblt) function to transfer data from the source memory to the destination memory according to a requested bitblt operation specified by one or more graphics parameters;
    bitblt generator generating a bitblt signature uniquely identifying the requested bitblt operation;
    a specialized bitblt function generator selecting a code block from a plurality of code blocks wherein each of the plurality of code blocks corresponding to a particular bitblt operation and the selected code block corresponding to the requested bitblt operation, and wherein the specialized bitblt function generator loads registers within intermediate language code generated by the specialized bitblt function generator with data obtained from the bitblt signature; and
    an optimization model optimizing machine-specific language code obtained from the intermediate language code during runtime, wherein the optimization module determines if an optimization should be performed based on whether the specialized bitblt function has been executed a specific number of times.

11. A system as recited in claim 10 wherein the specialized bitblt function generator copies the selected code block from the plurality of code blocks to the specialized bitblt function.

* * * * *